(12) United States Patent
Geissler

(10) Patent No.: US 10,582,135 B2
(45) Date of Patent: Mar. 3, 2020

(54) COMPUTER GENERATED IMAGERY COMPOSITORS

(71) Applicant: Michael Geissler, London (GB)

(72) Inventor: Michael Geissler, London (GB)

( * ) Notice: Subject to any disclaimer, the term of this patent is extended or adjusted under 35 U.S.C. 154(b) by 0 days.

(21) Appl. No.: 14/395,813

(22) PCT Filed: Apr. 17, 2013

(86) PCT No.: PCT/GB2013/050977
§ 371 (c)(1),
(2) Date: Oct. 20, 2014

(87) PCT Pub. No.: WO2013/156776
PCT Pub. Date: Oct. 24, 2013

(65) Prior Publication Data
US 2015/0131961 A1    May 14, 2015

(30) Foreign Application Priority Data

Apr. 18, 2012 (GB) .................................. 1206772.4

(51) Int. Cl.
*H04N 5/272* (2006.01)
*H04N 5/222* (2006.01)
(Continued)

(52) U.S. Cl.
CPC ........... *H04N 5/272* (2013.01); *G11B 27/036* (2013.01); *H04N 5/2224* (2013.01); *H04N 5/265* (2013.01)

(58) Field of Classification Search
None
See application file for complete search history.

(56) References Cited

U.S. PATENT DOCUMENTS

| 6,731,825 B1 * | 5/2004 | Acampora | H04N 5/2224 345/630 |
| 2006/0165310 A1 * | 7/2006 | Mack | G06T 7/2033 382/284 |
| 2008/0232778 A1 * | 9/2008 | Lin | H04N 5/222 386/219 |

OTHER PUBLICATIONS

International Search Report from ISA dated Jul. 29, 2013, in PCT/GB2013/050977.
(Continued)

*Primary Examiner* — Heather R Jones
(74) *Attorney, Agent, or Firm* — Richard A. Castellano; DNL Zito Castellano

(57) ABSTRACT

A system (10) for compositing a scene comprising a captured video image and a computer-generated background image, the system comprising: at least one video camera (12, 14, 16) for recording and storing a raw video image (22, 24, 26) of a scene and for outputting a working video image of the scene; a selector switch (20) operatively interposed between each of the video cameras (12, 14, 16) and a real-time compositor (18) for feeding a selected one of the working video images (22) at any given time to the real time compositor (18); the real time compositor (18) being adapted to incorporate a first CGI image (28) into the selected working video image (22) and to display a composite video image (32) representative of the final shot on a display screen (34); the system (10) further comprising: a data storage device (41) adapted to store an archive copy of the raw video images (22, 24, 26) from each of the video cameras (12, 14, 16) and a second compositor (30) operatively connected to the data storage device (41) for superimposing a second CGI image (62) onto any one or more of the video images captured by the video cameras (12, 14, 16), wherein the first CGI image (28) is a lower-resolution, or a simplified, version of the second CGI image (62).

13 Claims, 1 Drawing Sheet

(51) Int. Cl.
H04N 5/265 (2006.01)
G11B 27/036 (2006.01)

(56) References Cited

OTHER PUBLICATIONS

Written Opinion from ISA dated Oct. 18, 2014, in PCT/GB2013/050977.
European Office Action for related European Patent Application No. 13727306.6-1902 dated Mar. 23, 2016, 6 Pages.
Response to Nov. 10, 2014 Notice of Loss of Rights and Mar. 25, 2015 Rule 161 Communication Including Substantive Response to Written Opinion of the ISA for related European Patent Application No. 13727306.6—dated Jan. 5, 2016, 4 Pages.

* cited by examiner

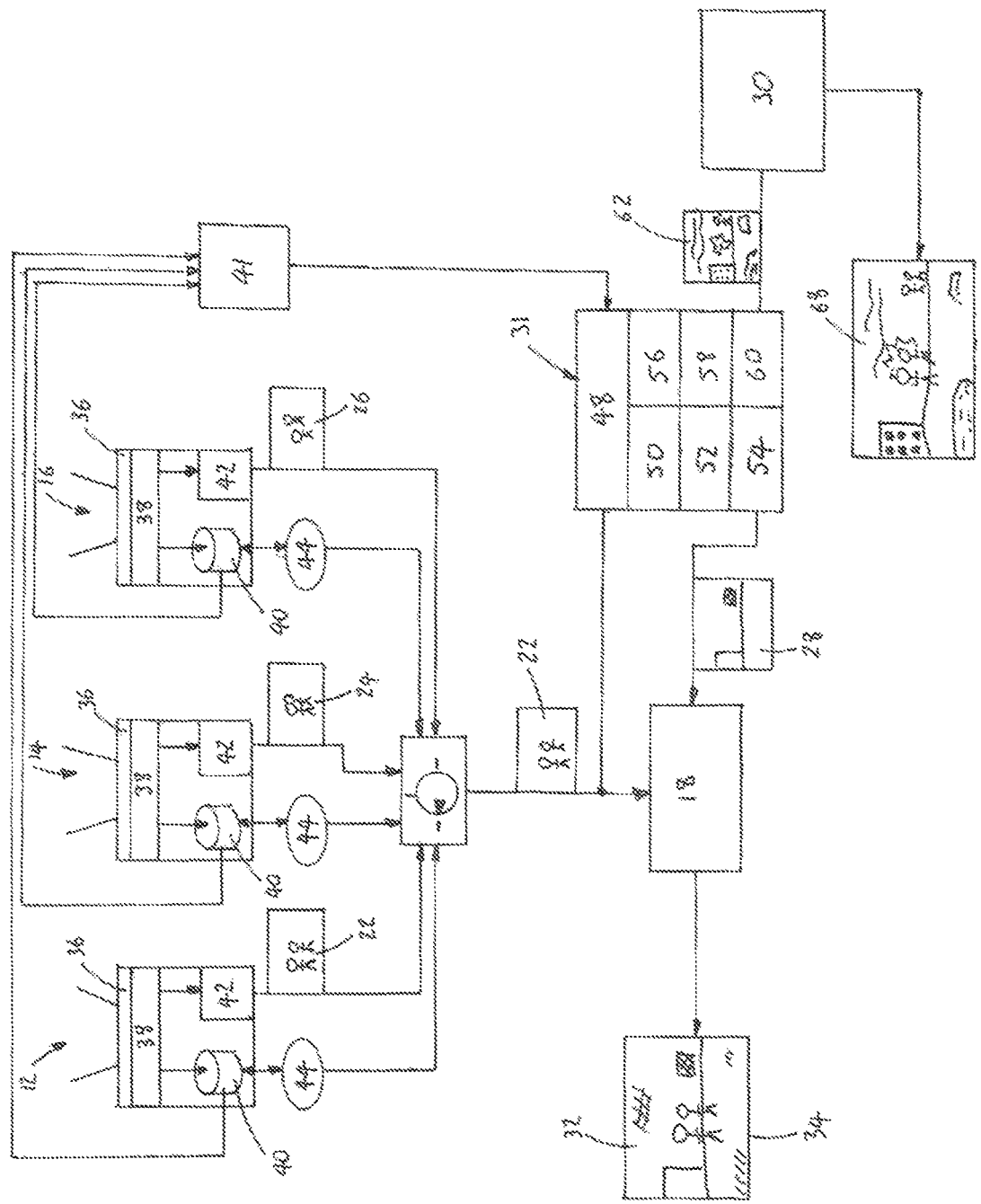

COMPUTER GENERATED IMAGERY COMPOSITORS

This invention relates to computer generated imagery (CGI) compositors, and in particular, but without limitation to, a hybrid system of real-time, near-time and postproduction CGI compositors.

In modern filming situations it is commonplace nowadays to use computer generated imagery (CGI) to overlay or superimpose backgrounds, effects and even actors or avatars into a scene of "real" footage. This is usually accomplished by the use of so-called "green screen" technology, whereby one or more cameras are used to capture the action, usually played by actors using a limited number of props, against a neutral background, usually a green screen. Computers are then used to subtract the foreground, that is to say the "real" actors and props from the neutral background, enabling the CGI to be added to the remaining portions of the footage.

In many situations, it is possible to perform this process in real-time, most notably, in relatively low-resolution filing situations, such as those found in newsroom and whether studios. In such cases, the CGI or background image is relatively simple, meaning that the processing requirements are sufficiently low for the compositor to be able to "keep up" with the footage as it is being shot—the result being real-time compositing.

However, when the complexity of the CGI increases, the data processing requirements of the compositor increase. For example, when filming a motion picture, it is commonplace for "location shots" to be filmed against a green screen background to avoid having to enact the scene at a real location. In such a situation, the background can be a complex landscape, including buildings, weather phenomena, moving water and so on, which all add a great deal of complexity to the background image. Furthermore, to add realism, false "depth of field" can be added to the background image such that only objects apparently within certain distances of the camera are in sharp focus, whereas the remainder of the scene is blurred. In addition, especially in action films, it is desirable to superimpose special effects, such as explosions, smoke plumes, etc. into the scene to add realism. Taking all the above into consideration, the process of rendering background images for motion pictures can be an extremely time-consuming operation involving high-powered computers working flat-out.

Inevitably, as CGI complexity increases, there comes a point whereby the compositor takes longer than one frame's interval to render each image. In fact, where highly realistic CGI backgrounds are used, the rendering can take, in extreme cases, days per frame. This means that the compositor is unable to "keep up" with the footage as it is being shot. Unfortunately, the complexity threshold for real-time compositing is quite low, which means that real-time compositing is not currently possible for many types of television series or motion picture filming situations. Therefore, most high-specification CGI work is done in a so-called "postproduction" studio, separately from the real-time acting.

Because of the amount of time it takes to carry out the postproduction process, most filming is done "blind", that is to say, with a considerable delay between shooting and being able to review the final motion picture. This is a direct result of the separation between the filming and postproduction processes. It is thus rarely possible to see the end result in real-time, which makes it difficult for film directors or actors to be able to appreciate the effect of what is being filmed as they are working on set. Often, therefore, it is necessary to re-shoot scenes if the position and motion of the actors, the lighting, etc. later, that is to say, after postproduction, is not correct with respect to the background.

Given sufficient computing power, it may be possible to achieve real-time compositing of high-specification CGI, but at the present time, existing computers the computing power to achieve this, or are prohibitively expensive. Moreover, the practical reality of the filming industry is that the more powerful the compositing computers become, the more the demand increases for ever more complicated and detailed CGI, such that the rendering time is never actually decreased.

A first example of a known compositing system is described in US2003174285A, which relates to a method and apparatus for producing motion pictures using real time composites of computer generated virtual backgrounds and live foreground images recorded on a sound stage includes camera motion tracking, automated lighting control, on-line editing, and production and asset management to accelerate the pace and reduce the cost of motion picture production. This system teaches two recording systems operating simultaneously, namely, a "high bandwidth" camera that digitally captures a foreground image, whilst at the same time, a down-converted DI signal is recorded using standard DI equipment. This system is principally directed at solving the problem (as it was at the time) of high-definition digital capture not being viewable in real-time—the down-converted image enabling an appreciation of the final shot to be obtain on-set. The system provides for previewing of digital video footage, with final rendering being performed in a postproduction process, after a cutting list has been determined.

A second example of a known compositing system is described in US2008012866A, which teaches a real-time method for producing animated performances. By this system, CGI characters are rendered in real-time at the same time as receiving the animation data. This system is concerned with filming a "live" actor and mapping his/her movements into a CGI device, which generates a cartoon character performing the same movements as the "live" actor. As such, the system enables a real actor to interface realistically with a CGI character, by playing against another real actor, whose body is later substituted for a cartoon.

A third example of a known compositing system is described in US2010026782A, which describes a system for acquiring video data and audio data. In this document, a VFX compositor is described that is adapted to receive an initial graphics output from a pre-visualization application. The VFX compositor is thus adapted to produce a rough composite image based on the initial graphics output, the input metadata, the captured image and possibly feedback to the pre-visualization application from the rough composite image itself. The rough composite image may be used in real time on the set to refine production data such as camera position, lighting design or the like prior to creating a final composite image. In this system only one compositing resolution is described.

A fourth example of a known compositing system is described in WO12013388A, which describes a measurement system having a camera sensor array that is configured to generate low-resolution video recordings. The camera sensor array is further configured to automatically generate high-resolution images at geometrically suitable positions in space. Automatic recording of the high-resolution images is based, in this system, on a three-dimensional real-time reconstruction of the video recordings. This system therefore teaches a camera sensor that can quickly switch between live images and high resolution shots. The live video images provide a rough, approximate, real time feedback about the status of the scene, whereas the high resolution images are merely recorded and saved to enable the real time construction to be refined a in a post processing step.

A fifth example of a known compositing system is described in US2012206653A. This document describes a system in which CGI compositing can be scheduled to make use of downtime and spare processing capacity. If real-time CGI is needed, the data can be multiplexed, or if it is not required, the available processing power can be shared. This document essentially describes what is known as a "render farm", whereby different users can share the resources of dedicated rendering computers.

A sixth example of a known compositing systems is described in US2007002069A whereby a parallel texture synthesis engine has controllable jitter such that parallel texture synthesis can be performed.

Whilst it is known to make use of parallel processing techniques to facilitate film production, no existing system enables the actors or directors to appreciate, in real time, the effect of lighting, effects, props, actors' movements etc. in a truly CGI environment. The known systems, for example US2003174285A, are concerned with parallel processing of video footage, the simplification of wireframe production methods, as described in US2008012866A, or with other methods of making ever higher processing power available for rendering. A need therefore arises for a system that provides the benefits of real-time compositing, that is to say, enabling the director and actors to appreciate the end result in real-time so that scenes can be reshot immediately, if necessary, coupled with the benefits of a conventional post-production process, that is to say whereby the background image can be relatively complicated.

According to a first aspect of the invention, there is provided a CGI compositing system comprising one or more primary compositors running in parallel with one or more secondary compositors, the primary compositor or compositors being optimised for rendering real-time GCI footage and the secondary compositor or compositors being optimised for rendering high-quality CGI footage.

A second aspect of the invention provides a system for compositing a scene comprising a captured video image and a computer-generated background image, the system comprising: at least one video camera for recording and storing a raw video image of a scene and for outputting a working video image of the scene; a selector switch operatively interposed between each of the video cameras and a real-time compositor for feeding a selected one of the working video images at any given time to the real time compositor; the real time compositor being adapted to incorporate a first CGI image into the selected working video image and to display a composite video image representative of the final shot on a display screen; the system further comprising: a data storage device adapted to store an archive copy of the raw video images from each of the video cameras and a postproduction compositor operatively connected to the data storage device for superimposing a second CGI image onto any one or more of the video images captured by the video cameras, wherein the first CGI image is a lower resolution, or simplified, version of the second CGI image.

Suitably, therefore, the invention operates two GGI rendering engines in parallel that work from a common set of video footage, for example, the raw video images. Such a configuration suitably allows for CGI rendering, that is to say, rendering of a three-dimensional computer model to be conducted at two different resolutions (levels of detail) simultaneously, with the lower resolution version of the CGI footage being composited in real time with the actual video footage to allow the effect to be seen in real-time, whereas the higher resolution CGI rendering is carried out in near-time, to enable the final composited footage to be reviewed later on. The invention is distinguished from the prior art in which different video resolutions are shot simultaneously, or different compositing settings are used simultaneously. Contrarily, the invention uses a common set of video footage and renders the CGI at two different resolutions.

According to the invention, by operating two compositors or sets of compositors in parallel, it may be possible for directors or actors to be able to appreciate the likely end result of the shoot in real time, whilst retaining the ability to render final footage in a higher quality format afterwards, that is to say in near-time or in postproduction. One of the main advantages of the invention is that it may afford directors and actors an opportunity to review the footage as it is shot, thereby enabling critical on-set decisions to be made quickly, thereby reducing the amount of re-shooting required. The invention may also afford improved continuity because scenes, sets, props etc. may not need to be laboriously re-created at a later point in time to reproduce a scene shot days or weeks previously, should a re-shoot be required. The invention may also provide a director with greater flexibility and creativity on-set because scenes can be shot or cut in several ways to see what works best, rather than having to be constantly wary of the significant postproduction costs and delays associated with a traditional postproduction approach.

Preferably, the CGI compositing system interfaces with one or more video cameras, most preferably via a selector switch. The selector switch preferably enables a director to cut between different cameras, as would usually occur in the postproduction cutting room. The selector switch is preferably adapted to interface with the primary compositor or compositors so that only the footage that is most likely to appear in the end result (the "director's cut") is rendered by the primary compositor or compositors. By selectively rendering only the footage that is likely to be needed, the amount of surplus rendering can be significantly reduced.

The secondary compositor or compositors may also be interfaces with the selector switch so that only the footage that is likely to be needed in the final cut is rendered in high quality. This too may also reduce the amount of wasted effort and processing.

In other words, the invention may provide a system that renders only footage that is likely to be utilised, rather than all of the live footage. Advantageously, by rendering substantially only the footage that is likely to be utilised, rather than all of the live footage, the secondary compositor or compositors may be able to "catch up" with the real time filming, for example, during set down-time. This aspect of the invention may gain back some of the lost time of a conventional quality-constrained system.

Preferably, all of the footage captured by the cameras is preserved in a data storage device, such as on a computer data server so that all of the recorded footage is available for re-cutting and re-rendering in a postproduction process. This option may provide the postproduction studio with the option to re-cut the footage and/or to re-render the CGI should changes be necessitated. The invention may therefore offer all of the benefits of existing postproduction CGI coupled with the benefits of real-time compositing and real-time "rough cutting" of the footage as it is being shot.

Notably, the primary and secondary compositor or compositors are most preferably interconnected on set and run simultaneously.

The system of the invention is preferably adapted to compose a scene comprising a captured video image and a computer-generated background image. This can be achieved by providing at least one video camera for recording raw video image of a scene and for outputting a working video image of the scene. The video camera or cameras preferably comprise, or are operatively connected to, a data storage device, for storing the raw video footage shot.

A selector switch is preferably operatively interposed between each of the video cameras and a primary, or real-time compositor for feeding a selected one of the working video images at any given time to the real time compositor, the real time compositor being adapted to incorporate a first CGI image into the selected working video image and to display a composite video image representative of the final shot on a display screen.

The system of the invention may further comprise a postproduction, or final quality compositor operatively connected to the data storage device for incorporating a second CGI image onto any one or more of the video images captured by the video cameras. The second CGI image is preferably of a higher resolution or quality of the first CGI image. The first CGI image may be a simplified version of the second CGI image.

In a most preferred embodiment of the invention, there is provided a system for compositing a scene comprising a captured video image and a computer-generated background image, the system comprising: at least one video camera for recording and storing a raw video image of a scene and for outputting a working video image of the scene; a selector switch operatively interposed between each of the video cameras and a real-time compositor for feeding a selected one of the working video images at any given time to the real time compositor; the real time compositor being adapted to incorporate a first CGI image into the selected working video image and to display a composite video image representative of the final shot on a display screen; the system further comprising: a data storage device adapted to store an archive copy of the raw video images from each of the video cameras and a postproduction compositor operatively connected to the data storage device for superimposing a second CGI image onto any one or more of the video images captured by the video cameras, wherein the first CGI image is a lower resolution, or simplified, version of the second CGI image.

The invention may advantageously provide a system whereby the real time compositor only renders a relatively low-resolution, or simplified, CGI image for a single, active camera at any given time, which may significantly reduce the amount of computer processing required to render a representation of the final shot. This may effectively enable the director and/or actors to visualise the end result in real time, without having to wait for a postproduction process to be completed.

The video cameras may comprise an on-board data storage device for storing the raw image files associated with each frame of the video. The cameras may also comprise frame buffer and a codec for converting the raw image files into a working or final output video file having a desired resolution, such as "full HD". The codec can be of any suitable type depending on the requirements of the shoot and postproduction.

Each camera may also comprise a position encoder for capturing the camera's position relative to a datum in the studio or set. The position encoder may capture and record the camera's position relative to the floor, the camera's pan, tilt and roll angle, zoom setting, focal length, etc. The positioning data is important for accurately transferring the captured video image into the computer-generated image either in real time, and/or in postproduction.

The selector switch, where provided, selectively connects one camera to the primary or real time compositor(s) for rendering a real time representation of the final shot, albeit in a desired lower quality format, to speed up the rendering time. However, the selector switch preferably only interfaces with the working image outputted from the or each video camera, there preferably being a further connection between the or each video camera and the postproduction compositing equipment. As such, the real-time rendering of the sample image can be independent of the raw data captured, which may enable a scene to be re-cut, as opposed to re-shot, on demand. In other words, using the raw image and camera position data, the real-time rendering can be re-run at a later time, albeit using different camera angles, so that the director and actors can evaluate the footage from different perspectives prior to committing to postproduction.

The postproduction, or secondary compositor(s), preferably comprises a computer-generated scene, which may be compiled from a series of static images, pre-shot video footage, but in most cases, from a three-dimensional computer model of a scene, which is rendered on-demand by the postproduction compositor(s). The quality of the computer-generated background can, of course, vary depending on the requirements of the shoot, for example, a feature film intended to be displayed on a cinema screen will have a much higher resolution, refresh rate and detail than, say, a background intended for a television series. Because the raw video footage remains intact, however, and is stored separately from the CGI, it is possible to re-master the final video in a number of resolutions, or for the resolution to be increased or decreased from scene to scene, depending on the CGI's complexity. This feature of the invention may be particularly advantageous when, say, shooting a TV series, because the amount of processing power and time required to render a "full HD" image is relatively low compared to the requirements of cinema footage. Owing to the start-stop nature of the filming process, the postproduction compositor(s), may, in certain circumstances, be able to "catch up" with the real-time shooting during periods of downtime, e.g. when the actors are resting, or when adjustments are being made to the set or lighting. As such, the invention may offer the possibility of near-time postproduction, that is to say, completed postproduction before the end of a day's shooting, enabling the final footage to be analysed in close proximity to the actual shoot. Moreover, because the real-time compositing can enable the amount of re-shooting to be reduced and the director to improvise or be creative during the shoot itself, the invention affords the possibility of greatly speeding-up the production of television programmes.

A preferred embodiment of the invention shall now be described, by way of example only, with reference to the accompanying drawing in which FIG. 1 is a schematic system diagram of a compositing system according to the invention.

In FIG. 1, a compositing system 10 comprises a number of video cameras 12, 14, 16 (in this case three video cameras) that are connected to a real time compositor 18 via a selector switch 20. The selector switch 20 enables just one camera 12, 14, 16 to provide a "live" video feed 22, 24, 26 from each of the cameras 12, 14, 16 to the real time compositor 18. The real time compositor 18 receives a relatively low quality, simplified or representative background image 28 to be superimposed behind the video feed 22, 24, 26, from a postproduction compositor 30 to produce a real-time representation 32 of the final shot on a display screen 34 that a director can watch in real-time. The director is thus able to cut from camera to camera during a shot, using the selector switch 20, and the representative image 32 is updated in real-time on his or her display screen 34.

Each camera 12, 14, 16 comprises an image capturing device 36, such as a CCD array, which provides an electronic output signal to a frame buffer 38. The frame buffer 38 produces individual frames of footage, which are stored as raw data files on a data storage device, such as the internal memory hard disk drive 40 shown, or on a data server 41. Each camera 12, 14, 16, also comprises a codec 42 for producing a live video feed 22, 24, 26 of a desired quality and resolution.

Each camera 12, 24, 26 is fitted with a data capture device 44 for capturing and recording the camera's position, pan, tilt, rotation, zoom and focus, which data is also stored on the camera's internal data storage device 40 or the data server 41. The data 46 is also fed to the postproduction compositor 30, via the selector switch 20 so that the postproduction compositor can render an appropriate background image 28 corresponding to each frame of live footage 22, which can be incorporated into the real time compositor 18.

To achieve this, the postproduction compositor in linked to a CGI generator 31, which comprises a computer-generated model 48 of a virtual scene and can render images 28 of a desired resolution and quality using a real-time rendering engine 50, a real-time frame buffer 52 and a real-time codec 54. As such, when the camera 12 moves or its settings are adjusted, the CGI generator 31 re-renders the background image 28 according to the updated "point of view" and incorporating any time-based scene changes that are built into the virtual model 48 of the CGI. The CGI image 28 is then incorporated with the real-time footage 22 by the real-time compositor 18 to produce a real-time image 32 of the composite scene.

Notably, the settings of the real-time rendering engine 50, real-time frame buffer 52 and real-time codec 54 are optimised for speed, rather than quality, such that each frame of CGI footage is rendered in less than one frame's time, enabling the rendering to be competed in real-time.

Meanwhile, the CGI generator 31 also runs a high-quality rendering engine 56, a high-quality frame buffer 58 and a high-quality codec 60, in parallel with the real-time rendering engine 50, real-time frame buffer 52 and real-time codec 54. Notably, the settings of the high-quality rendering engine 56, frame buffer 58 and codec 60 are optimised for quality, rather than speed, such that each frame of background footage is rendered in the desired postproduction quality, however long that takes. Nevertheless, the postproduction processor defaults to processing high quality background images 62 according to the selector switch's 20 position, thereby reducing the amount of unnecessary rendering that occurs, which speeds-up the postproduction process. Taking into account the downtime and the reduction in overall processing, the high-quality compositor 30 may even be able to render final quality backgrounds 62 and final shots 68 in near time, or shortly after actual shooting.

It will also be noted that the CGI generator and high-quality compositor 30 work on the raw data files stored on the camera's data storage devices 40 or on the data server 41, and so includes its own real image frame buffer 64 and codec 66 to enable the raw images to be rendered at an appropriate quality depending on the intended format of the final footage. As such, the raw data and the cameras' position data remain intact, which enables the final footage to be re-cut or re-rendered at a later time, should the need arise. This facility enables, say, TV- or DVD-quality footage to be re-mastered for cinema or Blu-Ray (or vice-versa) relatively easily, without having to re-shoot. Also, additional CGI effects can be added to the model in postproduction, which may require different cutting, again without having to re-shoot the scene.

In the illustrated embodiment, just one primary and one secondary compositor is shown for simplicity. There is no reason, however, why a number of primary and/or secondary compositors could not be increased or multiplexed to share the processing demand, or their functions integrated into a single machine.

The invention is not restricted to the specific details of the foregoing embodiment, which is merely exemplary of the invention. For example, the arrangement and interconnection of the various parts of the invention could be altered or re-routed, the number of cameras, compositors etc., could be changed, etc. without departing from the scope of the invention.

The invention claimed is:

1. A system for compositing a scene comprising a captured video image and a computer-generated background image, the system comprising:
   at least one video camera for recording and outputting a video feed of a scene and comprising a position encoder for capturing the camera's position relative to a datum in a studio or set;
   a data storage device adapted to store an archive copy of the video feed from the or each video camera and the data from the position encoder;
   a CGI generator comprising: a computer-generated model of a virtual scene; a real-time rendering engine, a real-time frame buffer and a real-time codec adapted to render a real-time CGI image of the computer-generated model in real-time according to the camera's position as determined by the position encoder; a high-quality rendering engine, a high-quality frame buffer and a high-quality codec adapted to render a second CGI image the computer-generated model according to the camera's position as stored in the data storage device;
   a real-time compositor, which composites the real-time CGI image with the video feed from the or each video camera in real-time; and
   a second compositor, which composites the second CGI image with the video feed as stored in the data storage device;
   the system being characterised by:
   the high-quality rendering engine, the high-quality frame buffer and the high-quality codec running in parallel automatically and independent of human interaction with the real-time rendering engine, the real-time frame buffer, and the real-time codec to render the real-time CGI image and the second CGI image in parallel; the real-time compositor running in parallel automatically and independent of human interaction with the second compositor to composite the real-time CGI image and the second CGI image in parallel to the video feed; and by the real-time CGI image being a lower-resolution, or a simplified, version of the second CGI image.

2. The system of claim 1, comprising a plurality of video cameras and a selector switch operatively interposed between each of the video cameras and the real-time compositor for feeding a selected one of the individual camera's video feeds at any given time to the real-time compositor.

3. The system of claim 1, comprising a plurality of video cameras and a selector switch operatively interposed between each of the video cameras and the second compositor, wherein the secondary compositor interfaces with the selector switch and defaults to processing the second CGI image according to the selector switch's position.

4. The system of claim 1, wherein the first and second compositors are provided in a computer, or in a network of interconnected computers.

5. The system of claim 1, wherein the data storage device comprises a data server.

6. The system of claim 1, wherein the real-time CGI image and the second CGI image comprise computerised representations of a three-dimensional environment.

7. The system of claim 1, further comprising a display screen for displaying the composite video image representative of the final shot.

8. The system claim 1, wherein the second CGI image is higher quality version of the real-time CGI image.

9. The system of claim 1, wherein the second CGI image comprises greater detail then the real-time CGI image.

10. The system of claim 1, wherein the or each video camera comprises an on-board data storage device for storing the raw image files associated with each frame of the video feed.

11. The system of claim 1, wherein the position encoder comprises a data capture device further comprising a position and/or attitude determining means associated with the or each camera.

12. The system of claim 11, wherein the position and/or attitude determining means comprises means for determining any one or more of the camera's position and/or attitude from the group comprising: the camera's position relative to the floor; the camera's pan angle; the camera's tilt angle; the camera's roll angle; the camera's zoom setting; the camera's focal length.

13. The system of claim 1, the real-time CGI image being a lower-resolution version of the second CGI image.

* * * * *